US012204806B2

(12) United States Patent
Chen et al.

(10) Patent No.: US 12,204,806 B2
(45) Date of Patent: Jan. 21, 2025

(54) DISPLAY CONTROL CHIP, OPERATING METHOD THEREOF AND DISPLAY SYSTEM COMPRISING THE SAME

(71) Applicant: Realtek Semiconductor Corporation, Hsinchu (TW)

(72) Inventors: Yung-Chih Chen, Hsinchu (TW); Wei-Chih Lin, Hsinchu (TW); Jui-Te Wei, Hsinchu (TW); Po-An Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 18/448,178

(22) Filed: Aug. 11, 2023

(65) Prior Publication Data
US 2024/0329903 A1 Oct. 3, 2024

(30) Foreign Application Priority Data
Mar. 31, 2023 (TW) .................................. 112112679

(51) Int. Cl.
*G06F 3/14* (2006.01)
*G06T 5/50* (2006.01)
(Continued)

(52) U.S. Cl.
CPC .................. *G06F 3/14* (2013.01); *G06T 5/50* (2013.01); *G06T 11/00* (2013.01); *G06T 2207/20221* (2013.01)

(58) Field of Classification Search
CPC ........ G09G 5/39; G09G 3/14; G09G 2340/12; G09G 2340/10; G06T 11/00; G06T 11/60; G06T 5/50; G06T 2207/20221
See application file for complete search history.

(56) References Cited

U.S. PATENT DOCUMENTS 5,325,183 A 6/1994 Rhee
8,224,152 B2 * 7/2012 Ryu ..................... H04N 9/8205
386/245

(Continued)

FOREIGN PATENT DOCUMENTS

CN 101431633 B 1/2011
CN 102141916 B 11/2013
(Continued)

*Primary Examiner* — Xuemei Zheng
(74) *Attorney, Agent, or Firm* — CKC & Partners Co., LLC

(57) ABSTRACT

A display control chip includes a first memory and a computing circuit. The first memory is configured to store a plurality of character images respectively corresponds to a plurality of characters of a character encoding format. The computing circuit is coupled with the first memory, and is configured to receive first update data generated by encoding input data according to the character encoding format, and is configured to use the first update data to update text data in a second memory. When the computing circuit reads the text data in the second memory, the computing circuit is configured to: search among the plurality of character images to find a plurality of target images corresponding to the text data; and output first display data according to the plurality of target images, in which the first display data is for generating a first display picture including the plurality of target images.

20 Claims, 6 Drawing Sheets

(51) Int. Cl.
   *G06T 11/00*   (2006.01)
   *G06T 11/60*   (2006.01)

(56) References Cited

U.S. PATENT DOCUMENTS

2008/0252604 A1    10/2008  Huang et al.
2010/0103319 A1*    4/2010  Li .................... H04N 5/44504
                                              348/569
2016/0055624 A1*    2/2016  Ohno .................. G09G 5/003
                                              345/589
2020/0167113 A1*    5/2020  Chen .................. G06F 13/102

FOREIGN PATENT DOCUMENTS

| | | |
|---|---|---|
| CN | 103916671 A | 7/2014 |
| CN | 104639854 B | 8/2017 |
| CN | 106162299 B | 4/2020 |
| TW | 201116054 A1 | 5/2011 |
| TW | I408958 B | 9/2013 |

* cited by examiner

DISPLAY CONTROL CHIP, OPERATING METHOD THEREOF AND DISPLAY SYSTEM COMPRISING THE SAME

RELATED APPLICATIONS

This application claims priority to Taiwan Application Serial Number 112112679, filed on Mar. 31, 2023, which is herein incorporated by reference in its entirety.

BACKGROUND

Technical Field

Present disclosure is related to an on-screen display (OSD) technology. More particularly, the present disclosure is related to a display control chip, an operating method and a display system that are able to customize and adjust OSD information.

Description of Related Art

On-screen display (OSD) information is built into the firmware of the display device, thus the display device is still able to display OSD information when it is not connected to a video signal source. The OSD information is usually used as a control menu of the display device, so as to allow users to configure the functions of the display device. However, the OSD information of traditional display device cannot be modified after leaving the factory, thus limiting the application scenarios of the display device.

SUMMARY

An operating method for a display control chip is provided in the present disclosure. The display control chip comprises a first memory configured to store a plurality of character images respectively corresponding to a plurality of characters of a character encoding format. The operating method comprises: receiving first update data generated by encoding input data according to the character encoding format; using the first update data to update text data in a second memory; converting the text data into a plurality of target images according to the plurality of character images; and outputting first display data according to the plurality of target images, wherein the first display data is for generating a first display picture comprising the plurality of target images.

A display control chip is provided in the present disclosure. The display control chip comprises a first memory and a computing circuit. The first memory is configured to store a plurality of character images respectively corresponding to a plurality of characters of a character encoding format. The computing circuit is coupled to the first memory, configured to receive first update data generated by encoding input data according to the character encoding format, and configured to use the first update data to update text data in a second memory. When the computing circuit reads the text data in the second memory, the computing circuit is configured to: search for a plurality of target images corresponding to the text data from the plurality of character images; and output first display data according to the plurality of target images, wherein the first display data is for generating a first display picture comprising the plurality of target images.

A display system is provided in the present disclosure. The display system comprises an input device, a display control chip, a second memory and a display circuit. The input device is configured to receive input data, and configured to encode the input data according to a character encoding format to generate first update data. The display control chip is configured to communicate with the input device for receiving the first update data, and comprises a first memory. The first memory is configured to store a plurality of character images respectively corresponding to a plurality of characters of the character encoding format. The second memory is configured to store text data. The display control chip is coupled to the second memory and the display circuit, and is configured to use the first update data to update the text data. When the display control chip reads the text data in the second memory, the display control chip is configured to: search for a plurality of target images corresponding to the text data from the plurality of character images; and output first display data to the display circuit according to the plurality of target images, so as to control the display circuit to display a first display picture comprising the plurality of target images.

One of the advantages of the aforementioned display control chip, operating method and display system is that customized information can be saved for a long time to be displayed repeatedly.

It should be understood that both the foregoing general description and the following detailed description are by examples, and are intended to provide further explanation of the disclosure as claimed.

DETAILED DESCRIPTION

Figure 1:
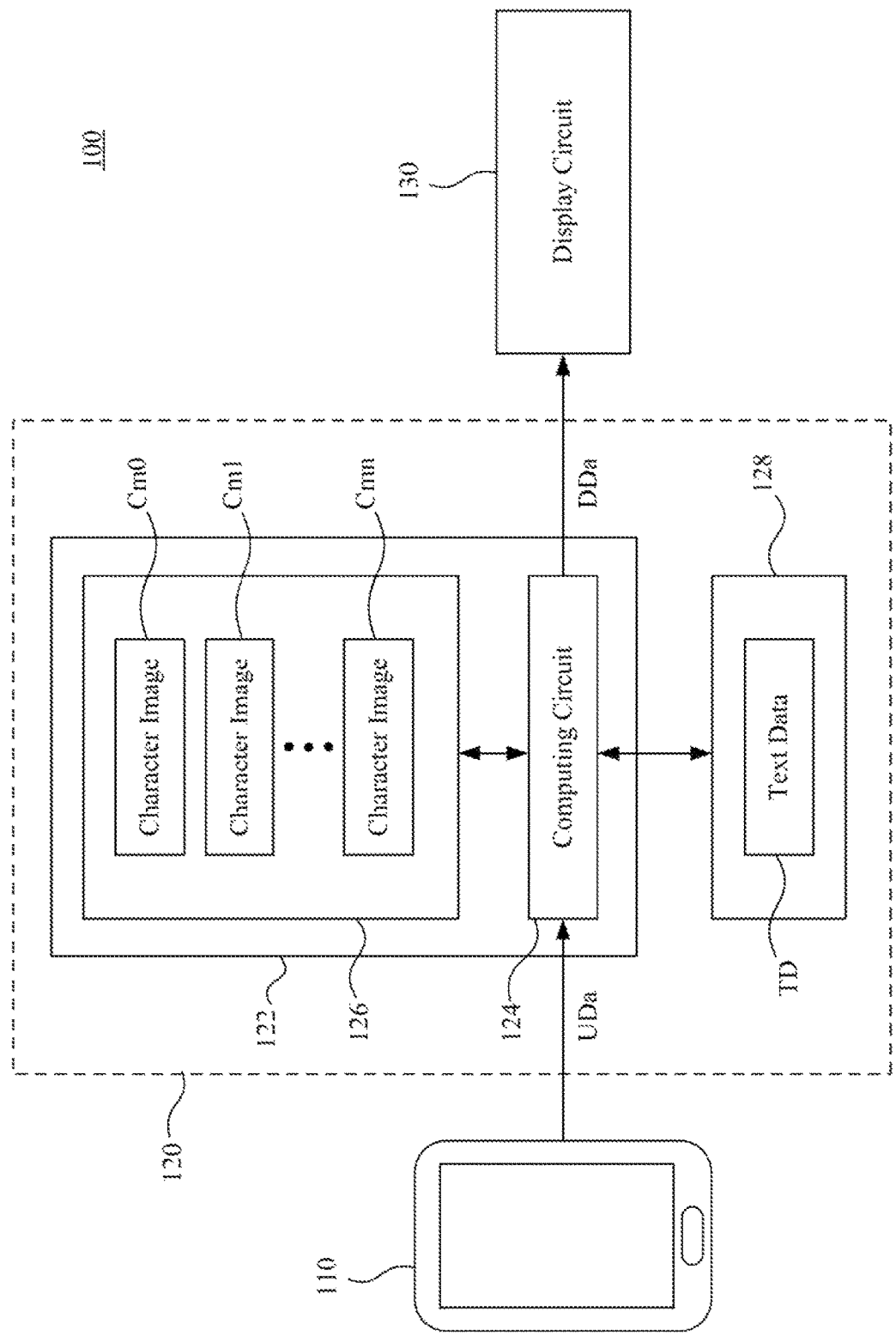
FIG. 1 is a simplified functional block diagram of a display system in accordance with an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of a display system 100 in accordance with an embodiment of the present disclosure. The display system 100 comprises an input device 110, a control circuit 120 and a display circuit 130. The control circuit 120 is coupled between the input device 110 and the display circuit 130. The input device 110 and the control circuit 120 may be coupled to each other through various suitable wired or wireless transmission methods, such as universal serial bus (USB), Wi-Fi, Bluetooth, universal asynchronous receiver/transmitter (UART), wired network, etc. The control circuit 120 is configured to receive update data UDa from the input device 110, and configured to output display data DDa to the display circuit 130 according to the update data UDa, so as to control on-screen display (OSD) information of the display circuit 130. In some embodiments, the control circuit 120 may receive video data from an external video source (not shown, such as a display card), and the control circuit 120 is configured to synchronously generate display data DDa according to the update data UDa and the video data.

In some embodiments, the display circuit 130 comprises a display panel, a data driving circuit, a scan driving circuit and a timing control circuit. The control circuit 120 and the display circuit 130 may be integrated into the same display device, such as a television, a computer screen or an electronic signage.

A display control chip 122 of the control circuit 120 comprises a computing circuit 124 and a memory 126. The computing circuit 124 may read the memory 126, wherein the memory 126 is configured to store character images Cm0-Cmn respectively corresponding to characters of a character encoding format.

In an embodiment, the aforementioned character encoding format is Unicode. Therefore, the character image Cm67 is an image of the letter "C", the character image Cm97 is an image of the letter "a", etc. In another embodiment, the aforementioned character encoding format is American Standard Code for Information Interchange (ASCII).

The computing circuit 124 may also read another memory 128 in the control circuit 120. The memory 128 is configured to store text data TD, wherein the text data TD comprises one or a plurality of character strings. The computing circuit 124 is configured to update the text data TD by using the update data UDa. The computing circuit 124 is further configured to read the text data TD, and control the OSD information displayed by the display circuit 130 according to the text data TD. In some embodiments, the memory 128 is a non-volatile memory, such as an electrically-erasable programmable read-only memory (EEPROM) or a flash memory.

In some embodiments, the display control chip 122 and the memory 128 are different circuits located on the same circuit board. In other embodiments, the memory 128 is a pluggable memory device (e.g., an USB flash drive), and is electrically connected to the display control chip 122 in a pluggable manner.

For convenience of description, in the following embodiments of the operation method of the display control chip 122, the Unicode is used as the character encoding format, but the present disclosure is not limited thereto. Person having ordinary skill in the art can understand based on the teachings of the present disclosure document that other suitable character encoding formats (e.g., ASCII) are also applicable to the operation method described below.

Figure 2:
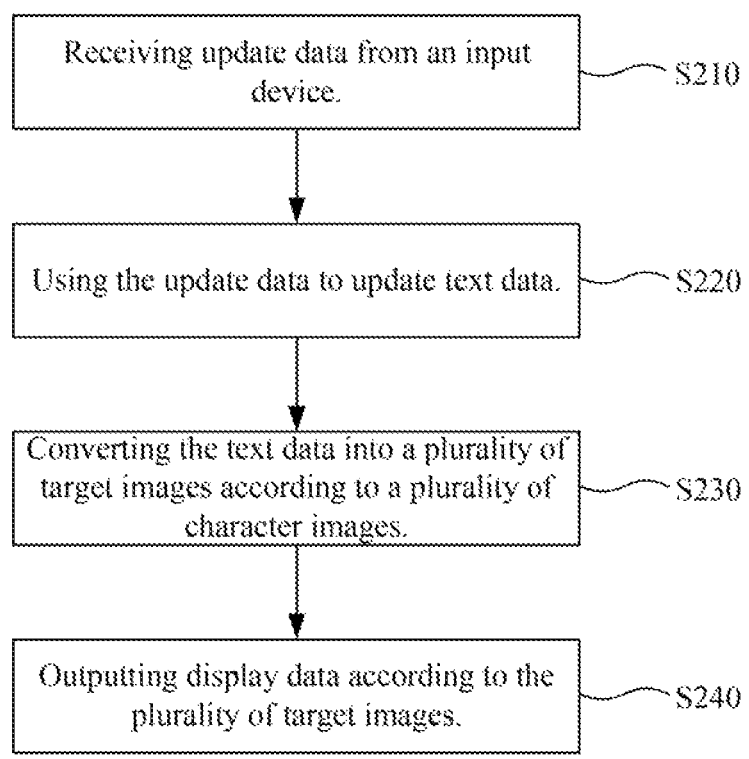
FIG. 2 is a flowchart of an operating method in accordance with an embodiment of the present disclosure.

FIG. 2 is a flowchart of an operating method 200 in accordance with an embodiment of the present disclosure. The operating method 200 is applicable to the display control chip 122 of FIG. 1. In step S210, the computing circuit 124 is configured to receive the update data UDa from the input device 110. The input device is configured to encode input data with the aforementioned character encoding format, so as to generate the update data UDa.

For example, the input device 110 may receive the input data from the user through an input interface (not shown, e.g., a keyboard, a touch screen or a microphone). For example, when the user wants to use the display circuit 130 as an electronic bulletin board, the user can input the text "Call Brian" to be announced into the input device 110 as the input data. Next, the input device 110 may convert the input data "Call Brian" into an Unicode string, and transmit the Unicode string to the computing circuit 124 as the update data UDa. Before the transmission, the input device 110 may further encode the update data UDa with UTF-8 encoding format to compress the size of the update data UDa. In other words, in the case that the input data is "Call Brian", the update data UDa may comprise 8 bytes, as shown in Table 1 below.

TABLE 1

| Byte number | 0 | 1 | 2 | 3 | 4 | 5 | 6 | 7 | 8 | 9 |
|---|---|---|---|---|---|---|---|---|---|---|
| UTF-8 code | 43 | 61 | 6c | 6c | 20 | 42 | 72 | 69 | 61 | 6e |

In some embodiments, the input device 110 may not need to comprise an input interface, and may generate the input data by itself. For example, the input device 110 may be a measuring instrument such as an illuminance meter, a decibel meter, etc., and the input device 110 may convert the measured value into the input data.

Next, in step S220, the computing circuit 124 updates the text data TD in the memory 128 by using the update data UDa. For example, the text data TD may comprise an Unicode string, and the computing circuit 124 replaces the Unicode string of the text data TD with the Unicode string of the update data UDa. Therefore, after step S220, the text data TD comprises the character string "Call Brian".

Figure 3:
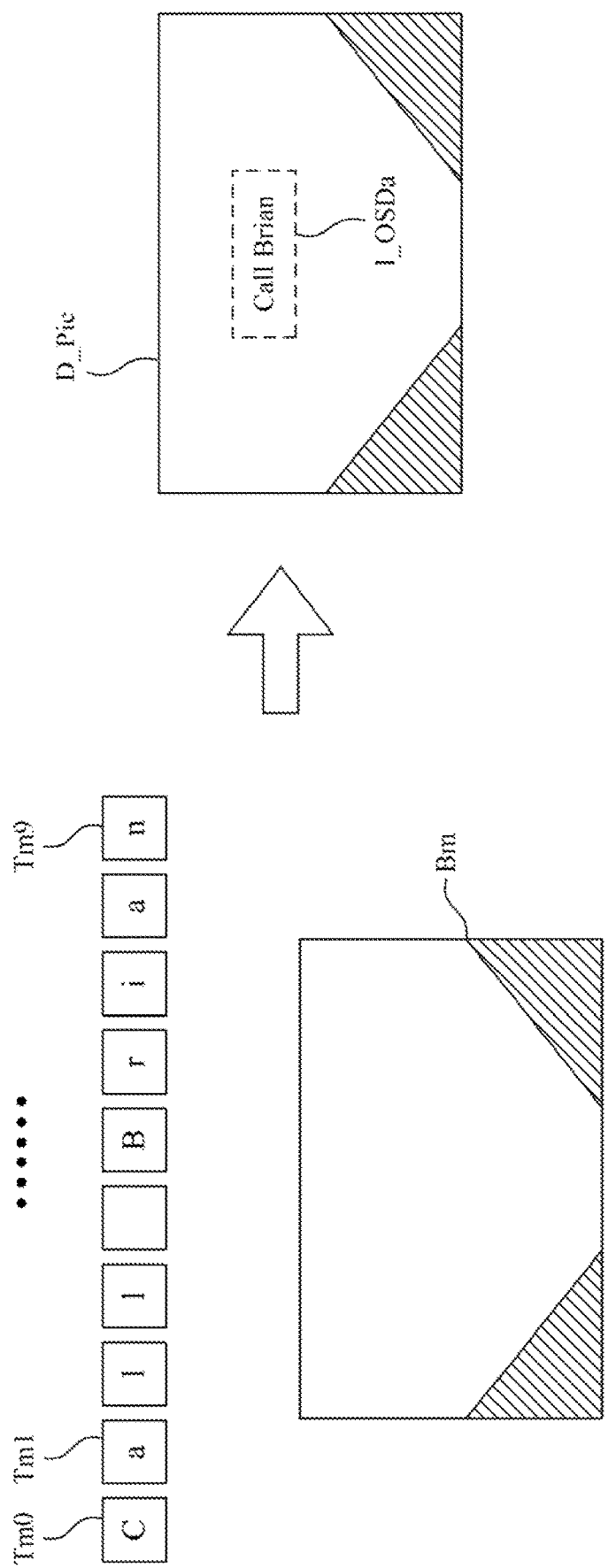
FIG. 3 is a schematic diagram of image overlaying in accordance with an embodiment of the present disclosure.

Please refer to FIG. 3 at the same time. FIG. 3 is a schematic diagram of image overlaying in accordance with an embodiment of the present disclosure. In step S230, the computing circuit 124 reads the text data TD in the memory 128, and converts the text data TD into target images Tm0-Tm9 of FIG. 3 according to the character images Cm0-Cmn in the memory 126. In detail, the computing circuit 124 searches a corresponding character image among the character images Cm0-Cmn for each character of the character string "Call Brian" of the text data TD, and take the searched corresponding character image as the target image of the character. For example, the computing circuit 124 takes the character image Cm67 (i.e., the image of the letter "C") as the first target image Tm0 of the character string "Call Brian", takes the character image Cm97 (i.e., the image of the letter "a") as the second target image Tm1 of the character string "Call Brian", etc. In other words, the sequence of the target images Tm0-Tm9 corresponds to the sequence of characters in the character string of the text data TD.

In step S240, the computing circuit 124 outputs the display data DDa to the display circuit 130 according to the target images, so as to control the OSD information displayed by the display circuit 130. For example, the computing circuit 124 is configured to overlay the target images Tm0-Tm9 to a background image Bm, and generates the display data DDa according to the result of overlaying. The display picture D_Pic in FIG. 3 is generated by the display circuit 130 according to the display data DDa, and the content of the display picture D_Pic is the new image generated by overlaying the target images Tm0-Tm9 to the background image Bm. In other words, the display picture D_Pic comprises the target images Tm0-Tm9 and the background image Bm at the same time, and the target images Tm0-Tm9 form the OSD information I_OSDa in the display picture D_Pic.

In some embodiments, the computing circuit 124 receives video data from an external video source (not shown, e.g., a display card) and acquires the background image Bm from the video data in step S240. In some embodiments that the external video source does not exist, the background image Bm may be stored in the memory 126 or the memory 128.

In yet some embodiments, the computing circuit 124 determines whether it has received the video data from an external video source in step S240 first. If it has, the computing circuit 124 acquires the background image Bm from the video data. If it has not, the computing circuit 124 reads the background image Bm in the memory 126 or the memory 128.

In some embodiments, steps S210-S220 may be performed repeatedly to modify the updated character string of the text data TD, until the computing circuit 124 receives an instruction from the input device 110 indicating the end of updating the text data TD. Next, the computing circuit 124 performs steps S230-S240.

Figure 4:
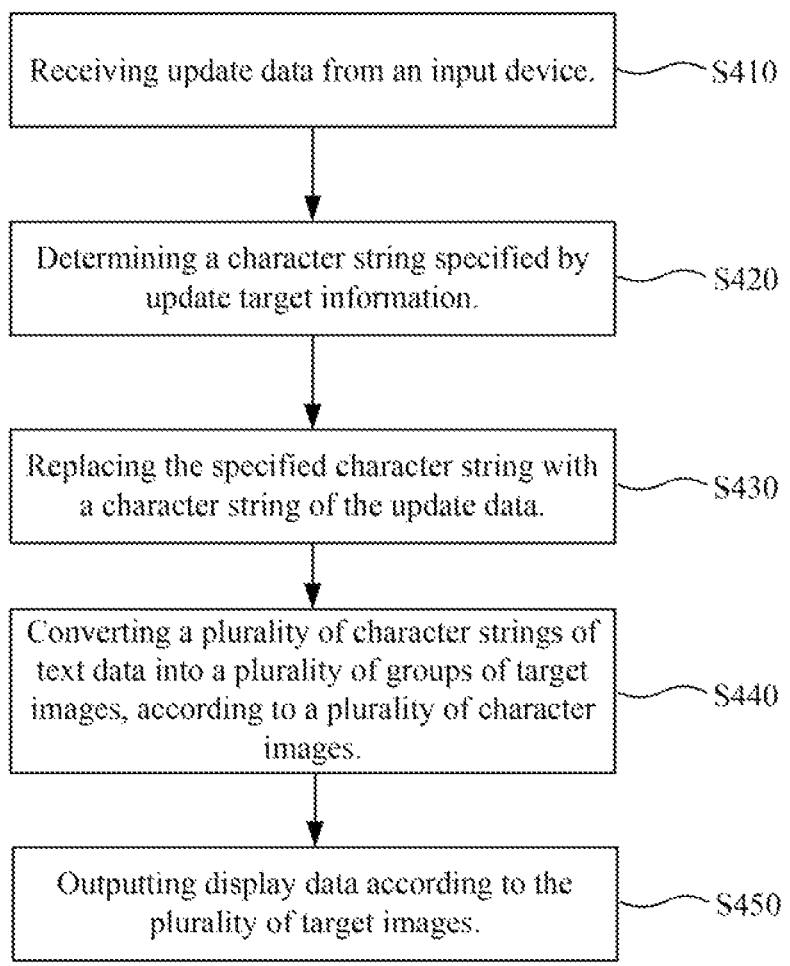
FIG. 4 is a flowchart of an operating method in accordance with an embodiment of the present disclosure.
Figure 5:
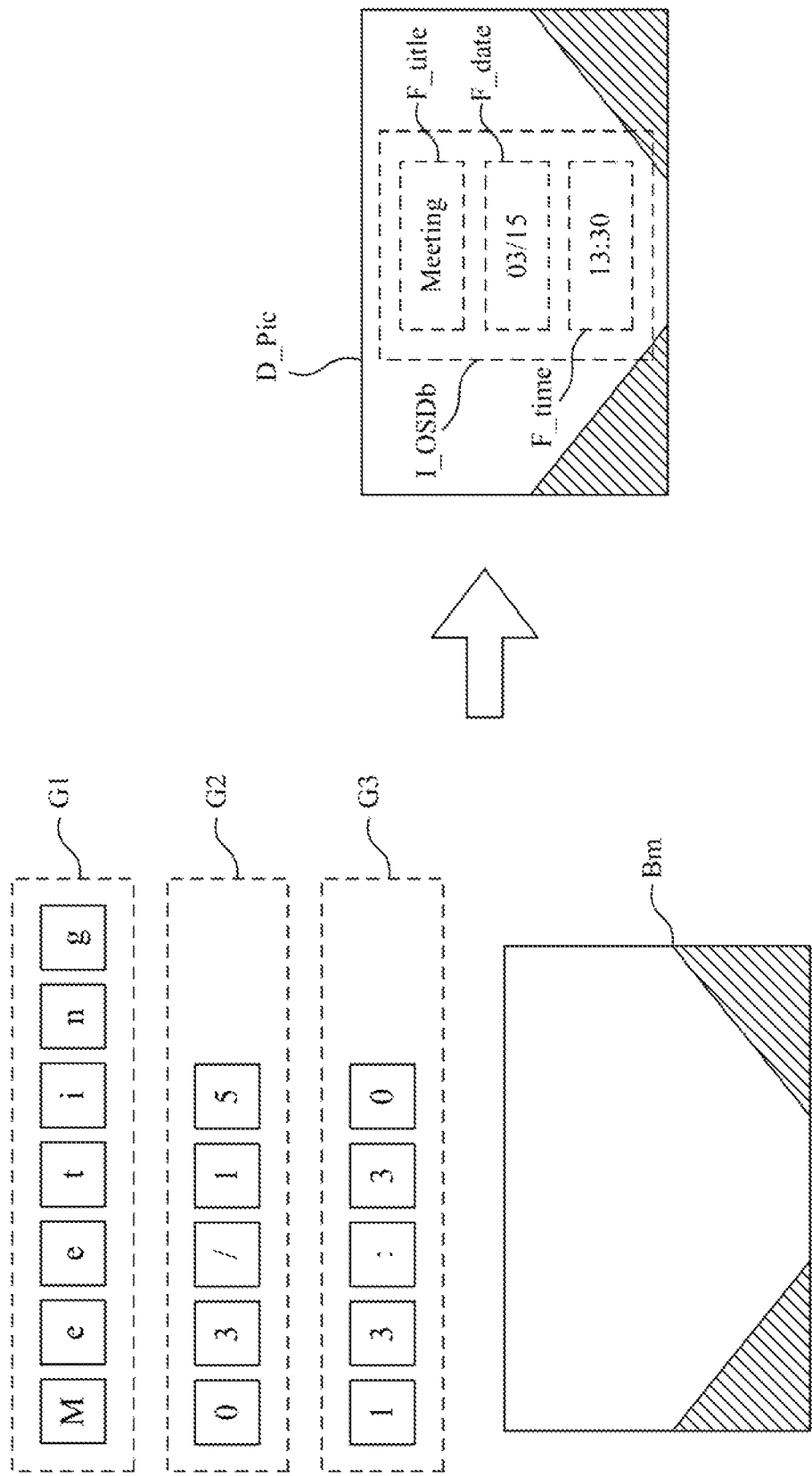
FIG. 5 is a schematic diagram of image overlaying in accordance with an embodiment of the present disclosure.

FIG. 4 is a flowchart of an operating method 400 in accordance with an embodiment of the present disclosure, wherein the operating method 400 is applicable to the display control chip 122. FIG. 5 is a schematic diagram of image overlaying in accordance with an embodiment of the present disclosure. In the following embodiments shown in FIG. 4 and FIG. 5, the text data TD in the memory 128 comprises a plurality of character strings (e.g., 3 character strings, but the present disclosure is not limited thereto). In an embodiment, the character strings of the text data TD are shown in Table 2 below. The character strings of the text data TD are referred to by different numbers below, but this is only for convenience of description, and is not used to limit the storage format of the character strings of the text data TD.

TABLE 2

| Number | 01 | 02 | 03 |
|---|---|---|---|
| Character string | Meeting | 03/15 | 13:30 |

Step S410 is similar to aforementioned step S210, except that the update data UDa comprises update target information in addition to the character string. The user can specify a specific character string of the text data TD that the user wants to update to the computing circuit 124 with the update target information. For example, the user can input the text "04/20" to the input device 110, and specify to update the character string numbered with "02" of the text data TD, thus the update data UDa will comprise the character string "04/20" and the update target information corresponds to the number "02".

In step S420, the computing circuit 124 determines the character string specified by the update target information first. Next, in step S430, the computing circuit 124 replaces the specified character string (i.e., the character string numbered with "02") with the character string of the update data UDa. Therefore, after step S430, the text data TD is shown in Table 3 below.

Therefore, after step S430, the text data TD is shown in Table 3 below.

TABLE 3

| Number | 01 | 02 | 03 |
|---|---|---|---|
| Character string | Meeting | 04/20 | 13:30 |

Please refer to FIG. 5 together, in step S440, the computing circuit 124 converts the character strings of text data TD into the target images of groups G1-G3, according to the character images Cm0-Cmn. For example, the computing circuit 124 may perform an operation similar to the aforementioned step S230 for each character string of the text data TD, so as to obtain the target images corresponds to the character string, and for the sake of brevity, details are not repeated here.

Step S450 is similar to the aforementioned step S240, that is, the computing circuit 124 overlays the target images of the groups G1-G3 to the background image Bm to generate the display data DDa. The difference between steps S450 and S240 is that in step S450, the computing circuit 124 uses the groups G1-G3 to respectively form three fields F_title, F_date and F_time of the OSD information I_OSDb in FIG. 5. In conclusion, with the operation method 400, the user can update the content of the specific field of the OSD information I_OSDb.

In some embodiments, steps S410-S430 may be performed repeatedly to update different character strings of the text data TD or modify the updated character string of the text data TD, until the computing circuit 124 receives an instruction from the input device 110 indicating the end of updating the text data TD. Next, the computing circuit 124 performs steps S440-S450.

In some embodiments, during the process of receiving the update data UDa and updating the text data TD by the computing circuit 124 (i.e., during steps S210-S220 or steps S410-S430), the computing circuit 124 may read a default image in the memory 126 and generate the display data according to the default image, so as to control the display circuit 130 to provide a display picture comprising the default image. The default image is used to inform the user that the computing circuit 124 is receiving the update data UDa. For example, the default image may comprise text such as "character string sending". In other embodiments, when the computing circuit 124 finish updating the text data TD (i.e., finish performing step S250 or S430), the computing circuit 124 may read another default image in the memory 126, and control the display circuit 130 to provide a display picture comprising the another default image. The another default image is used to inform the user that the computing circuit 124 has finished updating the text data TD. For example, the another default image may comprise text such as "character string modified successfully".

Figure 6:
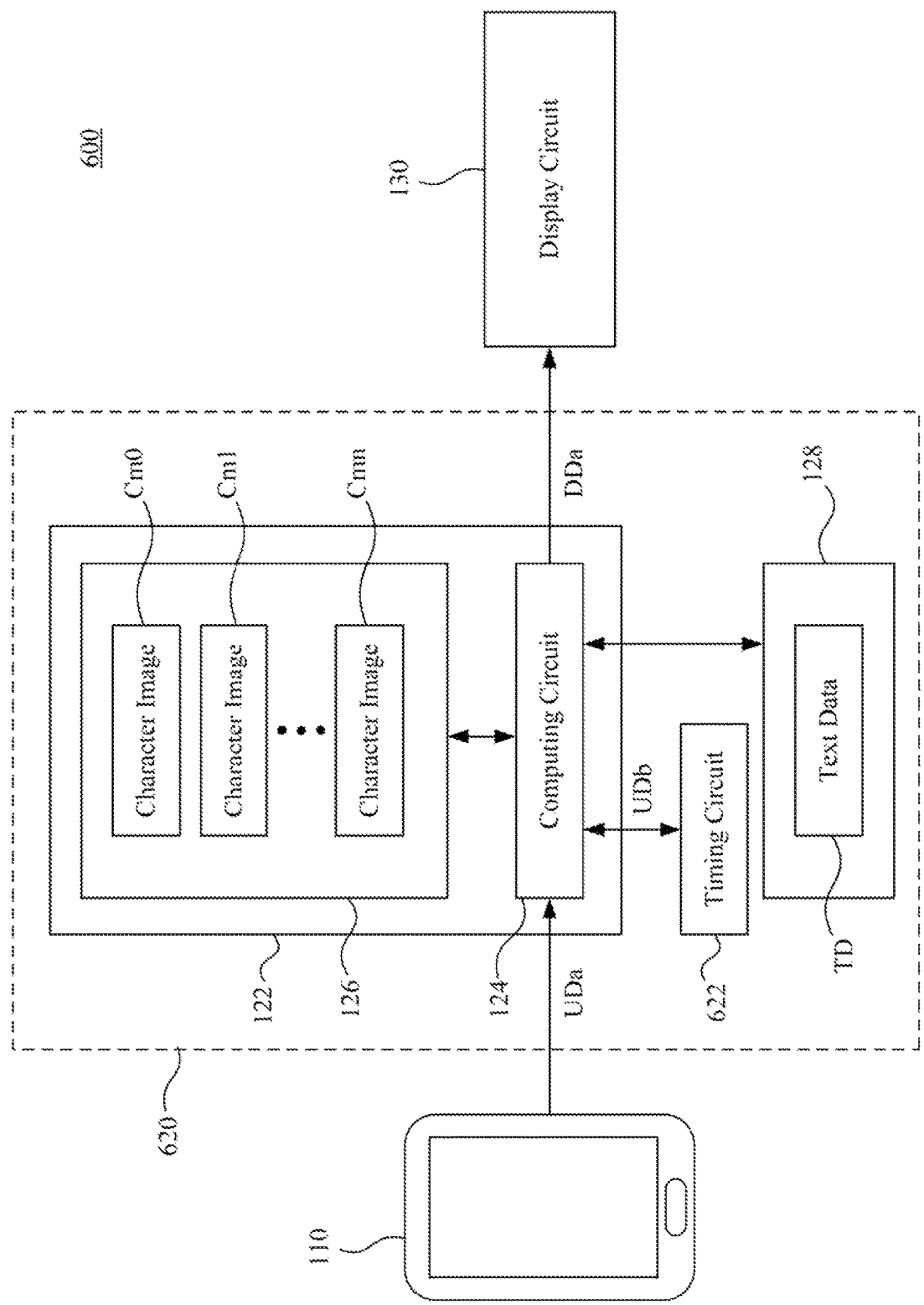
FIG. 6 is a simplified functional block diagram of a display system in accordance with an embodiment of the present disclosure.

FIG. 6 is a simplified functional block diagram of a display system 600 in accordance with some embodiments of the present disclosure. The display system 600 comprises the input device 110, a control circuit 620 and the display circuit 130. The display system 600 is similar to the display system 100 in FIG. 1, thus only the differences between the two will be described below. The control circuit 620 comprises the display control chip 122, the memory 128 and a timing circuit 622. The timing circuit 622 is configured to calculate an operating time of the display circuit 130. The operation time is, for example, the total lighting time of the display circuit 130 in a fixed time period (e.g., one day or one week).

The timing circuit 622 can convert the operation time into a character string (e.g., a character string "the screen time is 3 hours and 20 minutes"), and encode the character string by using the same character encoding format as that of the display control chip 122, so as to output update data UDb to the computing circuit 124. The computing circuit 124 may update the text data TD in the memory 128 with the update data UDb in a manner similar to the aforementioned step S220 or similar to the aforementioned steps S420-S430. For the sake of brevity, details are not repeated here.

It can be known from the above that the display system 100 in FIG. 1 and the display system 600 in FIG. 6 can store customized information for a long time. Even if the display device formed by the control circuit 120 (or the control circuit 620) and the display circuit 130 is powered off, the display device can still display the information previously stored by the user again when the display device is powered on next time. Therefore, the display systems 100 and 600 have a high flexibility, and are suitable for various situations where OSD information needs to be modified. For example, The management personnel of a company may push the information to be announced to each display device in the local network, through the main control computer of the local network. For another example, the user of the display device may use the OSD information to mark to-do items on the display device.

Certain terms are used in the specification and the claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. An operating method for a display control chip, wherein the display control chip comprises a first memory configured to store a plurality of character images respectively corresponding to a plurality of characters of a character encoding format, the operating method comprises:
    receiving an input data and encoding the input data according to the character encoding format by an input device, so as to generate a first update data;
    receiving the first update data from the input device by the display control chip;
    using the first update data to update text data in a second memory;
    converting the text data into a plurality of target images according to the plurality of character images; and
    outputting first display data according to the plurality of target images, wherein the first display data is for generating a first display picture comprising the plurality of target images.

2. The operating method of claim 1, wherein the second memory is a pluggable memory device.

3. The operating method of claim 1, wherein outputting the first display data according to the plurality of target images comprises:
    overlaying the plurality of target images to a background image to generate the first display data, wherein the background image is stored in the first memory.

4. The operating method of claim 1, wherein outputting the first display data according to the plurality of target images comprises:
    receiving a background image from an external video source; and
    overlaying the plurality of target images to the background image to generate the first display data.

5. The operating method of claim 1, wherein the first update data comprises update target information and a character string, the text data comprises a plurality of character strings, and using the first update data to update the text data comprises:
    determining corresponding one of the plurality of character strings of the text data specified by the update target information; and
    replacing the corresponding one of the plurality of character strings with the character string of the first update data.

6. The operating method of claim 1, further comprising:
    receiving second update data from a timing circuit, wherein the timing circuit is configured to calculate an operating time of a display circuit that generates the first display picture, and configured to convert the operating time into the second update data according to the character encoding format; and
    using the second update data to update the text data.

7. The operating method of claim 1, wherein receiving the first update data comprising:
    in response to receiving the first update data, reading a default image from the first memory; and
    outputting second display data according to the default image, wherein the second display data is for generating a second display picture comprising the default image.

8. A display control chip, comprising:
a first memory, configured to store a plurality of character images respectively corresponding to a plurality of characters of a character encoding format; and
a computing circuit, coupled to the first memory and an input device, configured to receive a first update data from the input device, and configured to use the first update data to update text data in a second memory;
wherein the first update data is generated by the input device by receiving an input data and encoding the input data according to the character encoding format,
wherein when the computing circuit reads the text data in the second memory, the computing circuit is configured to:
    search for a plurality of target images corresponding to the text data from the plurality of character images; and
    output first display data according to the plurality of target images, wherein the first display data is for generating a first display picture comprising the plurality of target images.

9. The display control chip of claim 8, wherein the computing circuit is configured to electrically connect to the second memory in a pluggable manner.

10. The display control chip of claim 8, wherein the computing circuit is configured to overlay the plurality of target images to a background image to generate the first display data, wherein the background image is stored in the first memory.

11. The display control chip of claim 8, wherein the computing circuit is configured to receive a background image from an external video source, and configured to overlay the plurality of target images to the background image to generate the first display data.

12. The display control chip of claim 8, wherein the first update data comprises update target information and a character string, the text data comprises a plurality of character strings, when the computing circuit uses the first update data to update the text data, the computing circuit is configured to:
determine corresponding one of the plurality of character strings of the text data specified by the update target information; and
replace the corresponding one of the plurality of character strings with the character string of the first update data.

13. The display control chip of claim 8, wherein when the computing circuit receives the first update data, the computing circuit is configured to:
read a default image from the first memory; and
output second display data according to the default image, wherein the second display data is for generating a second display picture comprising the default image.

14. A display system, comprising:
an input device, configured to receive input data, and configured to encode the input data according to a character encoding format to generate first update data;
a display control chip, configured to communicate with the input device for receiving the first update data, and comprising a first memory, wherein the first memory is configured to store a plurality of character images respectively corresponding to a plurality of characters of the character encoding format;
a second memory, configured to store text data; and
a display circuit;
wherein the display control chip is coupled to the second memory and the display circuit, and is configured to use the first update data to update the text data,
wherein when the display control chip reads the text data in the second memory, the display control chip is configured to:
search for a plurality of target images corresponding to the text data from the plurality of character images; and
output first display data to the display circuit according to the plurality of target images, so as to control the display circuit to display a first display picture comprising the plurality of target images.

15. The display system of claim 14, wherein the second memory is a pluggable memory device.

16. The display system of claim 14, wherein the display control chip is configured to overlay the plurality of target images to a background image to generate the first display data, wherein the background image is stored in the first memory.

17. The display system of claim 14, wherein the display control chip is configured to receive a background image from an external video source, and configured to overlay the plurality of target images to the background image to generate the first display data.

18. The display system of claim 14, wherein the first update data comprises update target information and a character string, the text data comprises a plurality of character strings, when the display control chip uses the first update data to update the text data, the display control chip is configured to:
determine corresponding one of the plurality of character strings of the text data specified by the update target information; and
replace the corresponding one of the plurality of character strings with the character string of the first update data.

19. The display system of claim 14, further comprising:
a timing circuit, configured to calculate an operating time of the display circuit, configured to convert the operating time into second update data according to the character encoding format, and configured to output the second update data to the display control chip,
wherein the display control chip is configured to use the second update data to update the text data.

20. The display system of claim 14, wherein when the display control chip receives the first update data, the display control chip is configured to:
read a default image from the first memory; and
output second display data to the display circuit according to the default image, so as to control the display circuit to display a second display picture comprising the default image.

* * * * *